(12) United States Patent
Meinander et al.

(10) Patent No.: US 8,202,356 B2
(45) Date of Patent: Jun. 19, 2012

(54) DEGASSING CENTRIFUGAL APPARATUS WITH SENSOR

(75) Inventors: Paul Olof Meinander, Grankulla (FI); Tom Cichoracki, Helsingfors (FI)

(73) Assignee: Pom Technology Oy AB, Helsinki (FI)

( * ) Notice: Subject to any disclaimer, the term of this patent is extended or adjusted under 35 U.S.C. 154(b) by 733 days.

(21) Appl. No.: 11/719,626

(22) PCT Filed: Nov. 11, 2005

(86) PCT No.: PCT/FI2005/050406
§ 371 (c)(1),
(2), (4) Date: Apr. 7, 2009

(87) PCT Pub. No.: WO2006/053944
PCT Pub. Date: May 26, 2006

(65) Prior Publication Data
US 2009/0201975 A1    Aug. 13, 2009

(30) Foreign Application Priority Data
Nov. 17, 2004    (FI) .................................... 20041480

(51) Int. Cl.
*B01D 19/00* (2006.01)
*C02F 1/20* (2006.01)
(52) U.S. Cl. ............... 96/157; 96/214; 96/217; 95/24
(58) Field of Classification Search .......... 96/214, 96/217, 157; 95/24, 261
See application file for complete search history.

(56) References Cited

U.S. PATENT DOCUMENTS

| 4,410,337 | A | | 10/1983 | Gullichsen et al. |
| 4,765,187 | A | | 8/1988 | Weinstein |
| 4,846,780 | A | * | 7/1989 | Galloway et al. ............... 494/3 |
| 5,003,823 | A | | 4/1991 | Rice |
| 5,039,320 | A | * | 8/1991 | Hoglund et al. ............... 96/214 |
| 5,861,052 | A | | 1/1999 | Meinander |
| 6,011,490 | A | * | 1/2000 | Tonnesen et al. ........... 340/870.3 |
| 6,723,205 | B1 | * | 4/2004 | Meinander ................... 162/189 |

FOREIGN PATENT DOCUMENTS

| GB | 2318529 A | 4/1998 |
| JP | 2004077338 A | 3/2004 |
| SU | 1267371 A1 | 10/1986 |
| SU | 1619029 A1 | 1/1991 |
| WO | 00/74812 A1 | 12/2000 |

* cited by examiner

*Primary Examiner* — Duane Smith
*Assistant Examiner* — Douglas Theisen
(74) *Attorney, Agent, or Firm* — Browdy and Neimark, PLLC

(57) ABSTRACT

The present invention relates to a degassing centrifugal apparatus (10), such as a degassing centrifugal pump (10) for use in a pulp- or papermaking process. The degassing centrifugal apparatus (10) according to the present invention comprises a rotatable hollow rotor (20) connected to a stationary fluid inlet (14) at one end portion and a stationary liquid outlet (18) at the opposite end portion, and having a gas exhaust (36) for removing gas from the centre thereof. The apparatus further comprises at said inlet end portion means (24) for rotating said fluid and directing it to the inner wall of said rotor (20). The apparatus further comprises a rotatable sensor (42) arranged to measure the layer thickness of a liquid (40) rotating in said apparatus.

31 Claims, 2 Drawing Sheets

DEGASSING CENTRIFUGAL APPARATUS WITH SENSOR

TECHNICAL FIELD OF THE INVENTION

The present invention, relates to a degassing centrifugal apparatus, such as a pump, comprising a rotatable sensor for measuring the layer thickness of a liquid rotating in said apparatus. The degassing centrifugal apparatus is especially suitable for backwater process in the production of paper or board in a paper machine.

BACKGROUND OF THE INVENTION

Backwater drained through a forming fabric in a papermaking process, normally, contains a large amount of entrained air. Since the short circulation of a paper machine requires a particularly constant flow, disturbing air is normally removed by conducting the drained backwater, by means of a special pipe or channel system, from the dewatering box or boxes to an open backwater tank. The deaerated water is then pumped back to the fiber process of the short circulation preceding sheet forming. Other liquids which require air free pumping are, among others, black liquor, deinking sludge and stock, coating color, etc.

Pumps, which are able to separate gas from a fluid to be pumped are well known as such, but the objective of such pumps is normally just to remove a sufficient portion of the gas to enable regular pumping. The known pumps are normally not capable of removing enough gas for achieving the degree of freedom of air, which is required for using the fluid directly for example in a papermaking process without further deaeration. Examples of prior art pumps capable of uniformly pumping fluids which contain gas are disclosed in Patents such as U.S. Pat. Nos. 4,410,337 and 5,039,320.

The same applicant's U.S. Pat. No. 5,861,052, the disclosure of which is included herein by reference, discloses a gas separating pump capable of separating air and water from a mixture thereof. The pump has a fluid inlet at one end and a pumping liquid outlet at the opposite end. Between inlet and outlet there is a hollow elongated gas separating rotor and a generally central outlet for separated gas. At the outlet end of the pump the diameter of the rotor forms a larger diameter pumping zone. The inlet end of the pump is provided with a set of blades for distributing the incoming fluid to the rotor walls and the outlet of the pump is provided with a blade wheel for pumping the degassed liquid. The pump is especially well suited for the gas-free re-cycling of backwater drained through a forming fabric in a papermaking process.

Further developments of said gas separating pump are disclosed in the same applicant's U.S. Pat. No. 6,723,205 and WO 00/74812, the contents of which are hereby included by reference.

In practice, said gas separating pumps of the present applicant have been provided with means for measuring the liquid layer thickness in the rotor. One prior solution for measuring the liquid layer (or water ring) thickness is based on a sensor system in which the sensor is statically supported on the end of a relatively long thick-walled pipe. This solution is, however, vulnerable to mechanical failures. Also the dirt build-up has been a considerable problem since it has required dirt compensation on the measured result, before using said result to adjust the flow system through the pumps. Also the relatively long pipe is vulnerable to vibration, which reduces the reliability of the measuring results.

SUMMARY OF THE PRESENT INVENTION

It is an object of the present invention to provide means for measuring the layer thickness of a liquid in a degassing centrifugal apparatus. The object of the invention is especially to provide a reliable sensor for measuring said layer thickness of the liquid.

An object of the present invention is to provide a sensor, which is less vulnerable to dirt build-up, and therefore, no (or less) dirt build-up compensation is needed.

An object of the present invention is to provide a sensor, which is less vulnerable to mechanical failures than prior solutions.

According to the preferred embodiment of the present invention there is provided a degassing centrifugal apparatus comprising:

a rotatable hollow rotor connected to a stationary fluid inlet at one end portion and a stationary liquid outlet at the opposite end portion, and having a gas exhaust for removing gas from the center thereof, said apparatus having at said inlet end portion means for rotating said fluid and directing it to the inner wall of said rotor, and said apparatus further comprising a rotatable sensor arranged to measure the layer thickness of a liquid rotating in said apparatus.

In a preferred embodiment of the invention, the degassing centrifugal apparatus is a degassing centrifugal pump. The means for rotating said fluid preferably comprises a first impeller. The apparatus generally comprises a second impeller at said outlet end portion.

The apparatus typically comprises a shaft extending from outside of the rotor into said outlet portion. Preferably the sensor is attached to the second impeller or to the shaft. Alternatively the sensor is attached to the rotor or to some other rotating element.

In a preferred embodiment of the invention, the sensor is arranged to measure the mutual capacitance of said liquid layer and said sensor. Alternatively the sensor is arranged to measure a distance to said liquid layer by means of a light beam measuring or by means of sounder measuring.

The apparatus further comprises converting means arranged to convert the measured signal into a digital or frequency signal. The converting means is preferably an electronic measurement card and is preferably attached to the second impeller or to the shaft.

In a preferred embodiment, the apparatus further comprises means for transferring the measured signal from the sensor to the converting means. The signal may be transferred over an air interface, through an intermediate material or through direct contact.

The apparatus further comprises means for transferring the digital or frequency signal from the converting means to a stationary signal processing means and rotatable and stationary coils arranged to transfer inductive signal. Means for transferring the signal comprises e.g. a radio transmitter implemented in the converting means and a radio receiver in the stationary signal processing means. The stationary signal processing means preferably further comprises receiving means, means for determining the liquid layer thickness, and means for transferring the signal from the receiving means to means for determining the liquid layer thickness. The apparatus further comprises means for conducting power from a stationary power supply to the sensor.

In a preferred embodiment of the invention, said hollow rotor has a length to diameter ratio which is at lease 2:1 and wherein at least half of the rotor length is arranged to rotate with a dry outer surface. More preferably said length to diameter ratio of said hollow rotor is preferably between 3:1 and 10:1. Said stationary liquid outlet comprises a stationary pump housing surrounding less than half of the rotor. The rotatable sensor is arranged to measure the liquid layer thickness on the inner wall of said rotor. Alternatively the rotatable sensor is arranged to measure the water ring in the pumping zone.

In a preferred embodiment of the invention, the apparatus is arranged to separate a gas from the fluid flowing in a pulp or papermaking process. Preferably the fluid is backwater in a papermaking process.

According to an embodiment of the invention, a signal indicating a measured liquid layer thickness is transmitted from the sensor to the stationary signal processing means via an air interface. In this embodiment of the invention, the sensor comprises a radio transmitter to transmit the measured signal through an air Interface and the stationary signal processing means comprises a radio receiver to receive the transmitted measurement signal.

The present invention provides various advantages over the prior solutions. The present solution provides a sensor system wherein the dirt build-up is reduced. This also reduces the need for dirt compensation, when analyzing the result. Also the sensor's vulnerability to mechanical failures is reduced as it need not be fastened via a long pipe. The reliability of the measurement is increased by attaching the sensor to the second impeller or a shaft, and therefore eliminating the vibration of the sensor attachment.

BRIEF DESCRIPTION OF THE DRAWINGS

The present invention, together with additional objects and advantages will be described in more detail with reference to the drawings, in which.

DETAILED DESCRIPTION OF CERTAIN EMBODIMENTS

In the following detailed description of the invention reference is made to the drawings, wherein the same numerals are used for the same or functionally similar parts. It is to be noted that the present pump operates largely in the same manner as the one described in the above mentioned U.S. Pat. No. 5,861,052. Reference is made to the detailed description in said patent, it being clear to those skilled in the art that many variations in the general construction and operation of the prior art pump are applicable to a large extent also to the pump according to the present invention.

Figure 1:
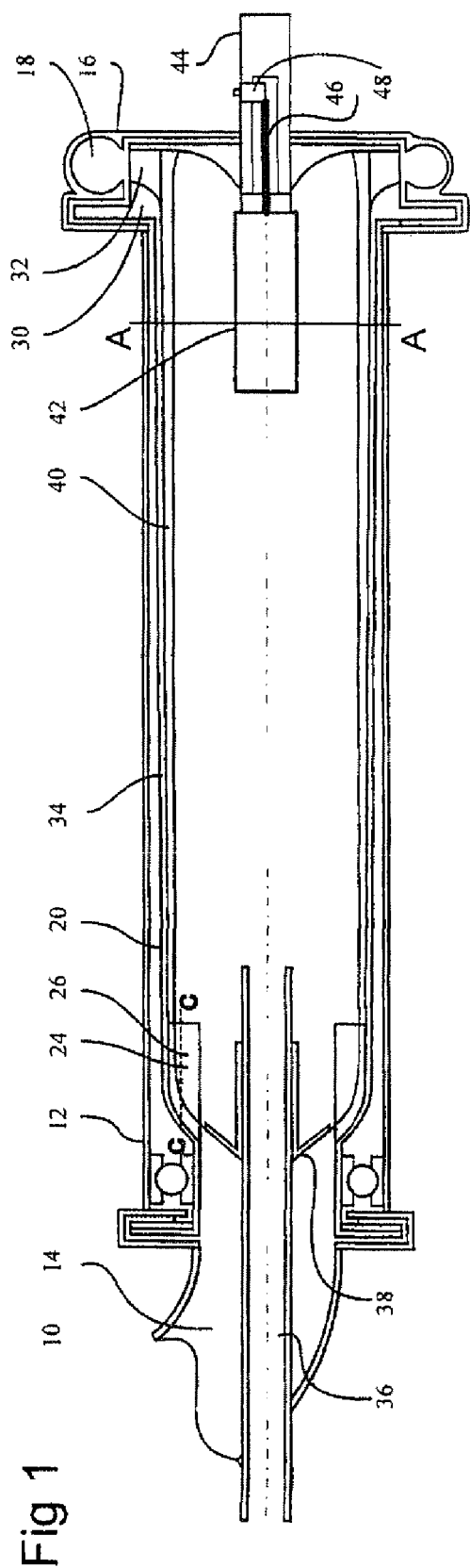
FIG. 1 shows a section of a degassing centrifugal pump according to the preferred embodiment of the present invention.

In the preferred embodiment of the present invention, according to FIG. 1, the degassing pump 10 comprises a rotatable hollow tubular rotor 20 with a stationary fluid inlet 14 at one end and a stationary liquid outlet 18 at the opposite end. The rotor 20 is surrounded by a stationary protective shell 12 and is rotatably mounted in bearings. The tubular shell 12 forms a protective air space around the rotor 20. The outlet end of the pump is surrounded by a stationary pump housing 16 for the degassed liquid to be pumped.

Attached to the inner wall of the rotor 20 there is at the inlet end a set of rotatable blades 24 forming a first (or inlet) impeller 26 and at the outlet end of the pump there is a second set of blades 32 forming a second (or outlet) impeller 30. Between the first impeller 26 and the second impeller 32 the degassing; body of the rotor 20 is formed as a substantially cylindrical drum 34. The drum 34 may also have a slightly conical design.

At the center of the rotor 20 the separated gas forms a gas column surrounded by a rotating fluid surface (i.e. fluid layer) 40. As the fluid flows from inlet to outlet said fluid layer 40 gradually releases all contained gas and transforms into a gas free layer of liquid or liquid suspension. In this description, the term fluid refers to a fluid which is a mixture of liquid and gas. The term liquid refers to a liquid or liquid suspension without gas.

In FIG. 1 at the center of the rotor 20 there is a stationary gas exhausting pipe 36 having on its outer periphery an annular inlet, throttle plate 38 slideable along the exhaust pipe. The throttle plate 38 is adapted for distributing the incoming fluid to the first impeller 26.

The pump bottom allows liquid to flow freely from said bottom and out through the annular opening which is formed between the rotor wall end and the bottom. In this embodiment the bottom of the pump 10 is shown as rotatable with the rotor 20.

The inner wall of the drum part 34 of the rotor 20 provides a large rotatable gas separation surface for separating entrained gas from the fluid. The gas separation surface should be sufficiently long for allowing sufficient time for the fluid to settle at the gas separation surface and for any gas enclosed in said fluid to separate, as said fluid flows from the inlet towards the outlet in said rotor 20.

In order to provide sufficient gas separation time and to obtain a favorable ratio between axial flow at said separation surface and the centrifugal force causing the separation, the drum 34 should preferably have a diameter which is smaller than half of the drum length. A suitable ratio of length to diameter is between 2 and 15, preferably between 3 and 10. Most preferably the ratio is between 3 and 8, although there is no definite limit in the length of the drum, except for possible technical difficulties encountered in having extremely long rotating devices.

The rotor 20 is rotated by a shaft 44, rotated by a motor (not shown), outside the rotor 20. Due to the rotation of said rotor 20, the fluid is caused to rotate rapidly on said separation surface and is subject to centrifugal forces, which cause the enclosed gas bubbles in the fluid-gas mixture to rise rapidly to the surface of the mixture and from there towards the center of the rotor 20.

In use of the apparatus there is formed a fluid layer 40 on the inner wall of the drum 34. Said layer 40 gradually releases all contained gas and transforms into a gas-free layer of liquid or liquid suspension (i.e. a liquid layer).

In order to provide a large and stable gas column in the separation part, and also a large surface of fluid layer 40, permitting an efficient gas separation, the gas column, should occupy a significant portion, preferably not less than half of the available volume of the gas separation part of the rotor 20. The fluid layer 40 should remain relatively thin, preferably less than one fourth and even more preferably below one sixth or less of diameter of the gas separation part, whereby the centrifugal forces cause only modest pressure build up in said fluid layer 40, and excessive compression of the gas bubbles enclosed in said fluid layer 40 is avoided.

FIG. 1 further shows the inventive concept of the sensing system. A rotating sensor 42 is attached to the second impeller 30. In one embodiment of the present invention the second impeller 30 extends from the outlet part of the degassing pump 10 towards the inlet part of the degassing pump 10. The sensor 42 according to the present invention is securely attached to the second impeller 30 e.g. by means of screws (not shown in FIG. 1). There is further an insulating flange (not shown in FIG. 1) between the sensor and the second impeller 30. The insulating flange is used to electrically isolate the sensor 42 from the ground.

The shaft 44 extends through the housing 16 of the degassing pump 10 and is attached to the second impeller 30. In the shown embodiment of the present invention there is implemented a signal transfer rod 46 or other intermediate material (in general a signal transfer means) in the second impeller 30. The signal transfer means are able to transfer the signal from the sensor 42 to converting means 48.

In an alternative embodiment of the present invention the shaft 44 extends through the housing 16 of the degassing pump 10 and through the second impeller 30. In this embodiment the shaft 44 is attached (or positioned with bearings) to the second impeller 30, and the sensor 42 is attached to the shaft 44. There is further an insulating flange between the shaft 44 and the sensor 42 for the purposes of isolating the sensor 42 from the ground.

In the preferred embodiment of the invention there is further a converting means 48 that is attached to the shaft 44. The converting means 48 is preferably attached to the portion of the shaft part 44 that is located outside of the pump housing 16 by means of e.g. screws. The converting means may be e.g. an electronic card capable of converting a signal into a frequency signal.

The sensor 42, the second impeller 30 (and also the shaft 44), and the converting means 48 all preferably rotate together with and at the same speed as the rotor 20. The rotation of sensor 42 will greatly decrease the dirt build-up on the sensor 42 compared to a stationary sensor. Reduced dirt build-up also eliminates the need to perform dirt compensation in the measure evaluation means such as the computing means to calculate the liquid layer thickness. The rotating elements also allow a weak signal conversion to a form suitable for transfer from rotating elements to static elements.

In the preferred embodiment of the present invention, the sensor 42 is arranged to measure the distance to the surface of the liquid layer 40 and to provide information on the thickness of the liquid layer 40 (or alternatively a liquid ring in a pumping zone at the liquid outlet of the degassing pump 10), in order to provide information for the control system of how the pump rotation and/or the fluid flow may be adjusted (to achieve more efficient use of the degassing pump). In the preferred embodiment of the present invention the sensor 42 is arranged to measure the mutual capacitance of the liquid and the sensor 42 (or sensing element). Alternatively, the sensor 42 is arranged to measure the distance of the liquid layer from the sensor 42 by utilizing a light beam or ultra sound (e.g. an echo sounder). The principles of such measurements are well known to the man skilled in the art, and therefore, not disclosed in more details herein.

The measurement result is transferred in form of a signal from the sensor 42 through the signal transfer means 46 to the converting means 48. The converting means 48 performs the signal conversion e.g. from capacitive signal (Pico-farad signal) into frequency signal (Megahertz signal). The signal may be transferred to the static receiver via air or via a direct contact. The signal may be transmitted from the converting means 48 to the static receiver e.g. by directing the transmitter of the converting means 48 to the signal receiver of the static receiver and/or keeping the distance between the transmitter and the receiver close enough and the transmitting power low enough so that the signal will not interfere with other devices e.g. in a paper machine. The signal may also be transferred through rotating and stationary coils as an inductive signal. The rotating and stationary coils may also be used for conducting power from a stationary power supply to the sensor (and possibly to the converting means).

The static receiver receives the signal from the converting means 48, where after the static receiver transmits the received signal to external electronics. In this connection the external electronics refers to the external electronics that are located outside the degassing pump 10. The static receiver and external electronics form a stationary signal processing means. The stationary signal processing means further comprises means for transferring the received signal from the static receiver to external electronics.

The external electronics may comprise e.g. a computer with appropriate additional hardware, which is capable of converting the received signal into information of the thickness of the liquid layer and to display the results to an operator (or supervisor) of the process. In this way the sensing system (comprising sensor and signal transfer, converting and displaying means) may be utilized to control the inlet flow of the fluid to the degassing pump 10, the rotation speed of the rotatable parts of the degassing pump 10, and possible calibration of the sensor 42 (and also other parts of the sensing system).

Instead of using a gas exhausting pipe 36 in the inlet part of the pump, the gas exhaust may be provided e.g. by means of a gas outlet extending centrally or decentrally from the pump housing 16 in the outlet end portion.

Figure 2:
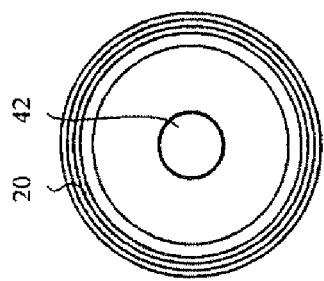
FIG. 2 shows a section of a degassing pump of FIG. 1 along line A-A.

FIG. 2 shows a section of a degassing pump of FIG. 1 along line A-A. FIG. 2 illustrates that the sensor 42 according to the inventive concept is placed centrally in respect to the rotor 20.

Figure 3:
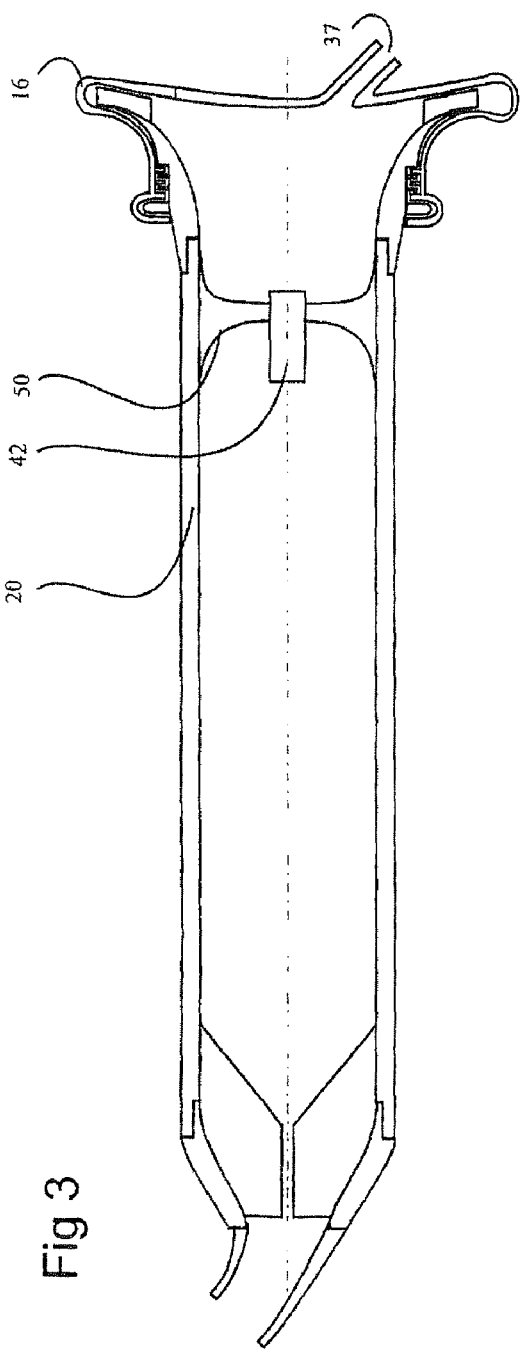
FIG. 3 shows a section of a degassing centrifugal pump according to an alternative embodiment of the present invention.

FIG. 3 shows a section of a degassing centrifugal pump according to an alternative embodiment of the present invention. The pump according to this embodiment of the present invention corresponds to the pump of the preferred embodiment of the present invention, except for the sensor 42 and the gas outlet. In this embodiment the gas outlet 37 is illustrated as being placed to extend decentrally from the wall of the pump housing 16 in the outlet end portion of the pump.

In this embodiment of the present invention the sensor 42 is attached with attachment means 50 to the rotor 20 wall. The sensor 42 is placed centrally in the rotor 20. The sensor 42 may be attached to the rotor 20 e.g. by means of metal rods (or other attachment means) fastened to the rotor 20.

In this alternative embodiment of the present invention the measured signal is sent from the sensor (or transmitting means attached thereto) through an air interface to a stationary signal processing means (not shown). Thereafter the stationary signal processing means processes the signal so as to indicate a liquid layer thickness, which may be shown to an operator of the system.

Figure 4:
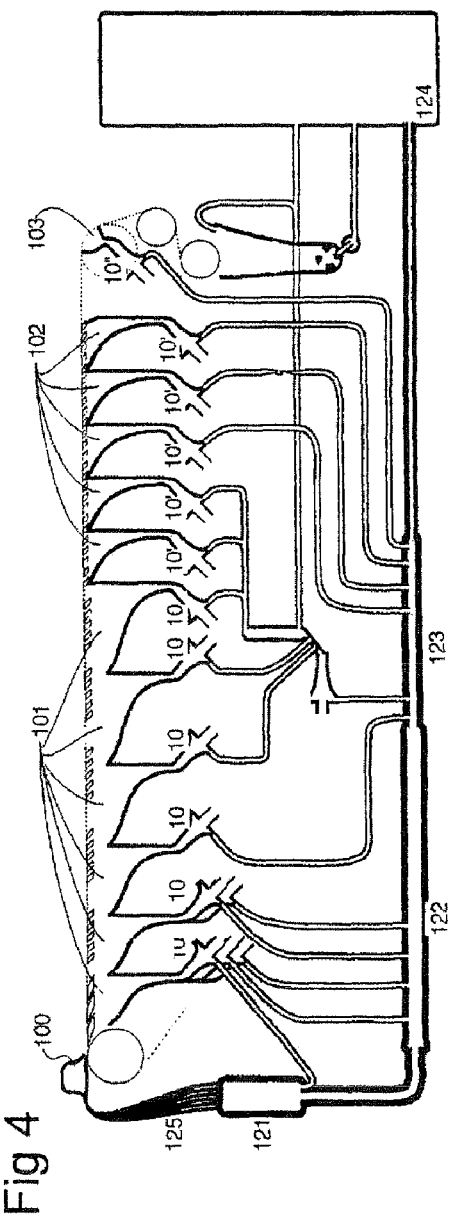
FIG. 4 shows the application of degassing centrifugal pumps according to the invention in a papermaking process.

FIG. 4 shows the application of degassing centrifugal pumps according to the invention in a papermaking process.

The solution according to FIG. 4 represents a papermaking process, where thin stock is fed through a headbox 100 onto a forming wire, for the forming of a web. Backwater Graining through the forming wire is collected in drainage boxes 101, suction boxes 102 and the suction roll 103 and flows directly into degassing pumps 10, 10' and 10", according to the present invention. The degassing pumps 10' and 10" relating respectively to suction boxes and to a suction roll may be connected to a vacuum source (not shown) for providing the suction needed in said suction boxes and said suction roll.

The degassing pumps 10, 10', and 10" separate the air contained in the backwater and feed the backwater as separate air free flows to various dilution points in the primary fiber process. Said fiber process goes from stock separation 124 through a mixer 123, centrifugal cleaner 122, screen 121 and stock distributor 125 to the headbox 100 and further to paper web forming.

The degassing pumps according to the present invention, thus provide means for fast and direct recycling of essentially air free backwater into the fiber process of a papermaking machine wet end.

A process for producing paper or board according to the present invention may be operated in principle according to normal papermaking operations which include steps of providing a papermaking stock of pulp; diluting said stock in one or more stages with backwater drained through a forming wire of said paper machine; feeding said stock through a headbox of said paper machine onto said forming wire; forming a web on said forming wire while allowing water from said stock to drain through said wire; feeding said web through a press section and a drying section of said paper machine to provide paper or board.

It will be appreciated by the skilled person in the art that various modifications may be made to the above described embodiments without departing from the scope of the present invention, as disclosed in the appended claims. For example, the sensor may be any kind of rotatable sensor that is capable of measuring the distance of the liquid layer from the sensor. Further the form of the signal may vary depending on the type of the transmitter-receiver that is used. The form of the signal may be e.g. digital signal instead of frequency signal. Also the speed of the liquid flow with respect to the speed of the rotor may vary. The liquid may be a low viscosity liquid like water or a higher viscosity liquid or suspension like fiber stock. The gas may be air or another gas substantially lighter than the liquid component of the mixture. Thus, the liquid may contain fibers or impurities such as ink particles to an amount, which does not, however, make the fluid mixture excessively viscous.

The invention claimed is:

1. A degassing centrifugal apparatus comprising
a rotatable hollow rotor connected to a stationary fluid inlet at one end portion and a stationary liquid outlet at the opposite end portion, and having a gas exhaust for removing gas from the center thereof,
said apparatus having at said inlet end portion means for rotating said fluid and directing it to the inner wall of said rotor, characterized in that the apparatus further comprises a rotatable sensor arranged to measure the layer thickness of a liquid rotating in said apparatus
said means for rotating said fluid comprises a first impeller and wherein said apparatus further comprises a second impeller at said outlet end portion,
said apparatus further comprising a shaft extending from outside of the rotor into said outlet portion,
wherein the sensor is attached to the second impeller or to the shaft.

2. An apparatus according to claim 1, wherein said degassing centrifugal apparatus is a degassing centrifugal pump.

3. An apparatus according to claim 1, wherein the sensor is attached to the rotor and the sensor is placed in the center of the rotor.

4. An apparatus according to claim 1, wherein the sensor is arranged to measure the mutual capacitance of said liquid layer and said sensor.

5. An apparatus according to claim 1, wherein the sensor is arranged to measure a distance to said liquid layer by means of light beam measuring.

6. An apparatus according to claim 1, wherein the sensor is arranged to measure a distance to said liquid layer by means of ultra sound measuring.

7. An apparatus according to claim 1, further comprising converting means arranged to convert the measured signal into a digital or frequency signal.

8. An apparatus according to claim 7, wherein the converting means is an electronic measurement card.

9. An apparatus according to claim 7, wherein the converting means is attached to the second impeller or to the shaft.

10. An apparatus according to claim 7 further comprising means for transferring the measured signal from the sensor to the converting means.

11. An apparatus according to claim 10, wherein the means for transferring the measured signal is one of the following: a transmitter-receiver pair arranged to transfer the signal over an air interface, a transmitter-receiver pair arranged to transfer the signal through an intermediate material, or a transmitter-receiver pair arranged to transfer the signal through direct contact.

12. An apparatus according to claim 11 further comprising means for transferring the digital or frequency signal from converting means to a stationary signal processing means.

13. An apparatus according to claim 12, wherein the means for transferring the digital or frequency signal comprises a radio transmitter implemented in the converting means and a radio receiver in the stationary signal processing means.

14. An apparatus according to claim 13, wherein the stationary signal processing means comprises receiving means and means for determining the liquid layer thickness.

15. An apparatus according to claim 14, wherein the stationary signal processing means further comprises means for transferring the digital or frequency signal from receiving means to means for determining the liquid layer thickness.

16. An apparatus according to claim 12, wherein the stationary signal processing means comprises receiving means and means for determining the liquid layer thickness.

17. An apparatus according to claim 16, wherein the stationary signal processing means further comprises means for transferring the digital or frequency signal from receiving means to means for determining the liquid layer thickness.

18. An apparatus according to claim 12, wherein the stationary signal processing means comprises receiving means and means for determining the liquid layer thickness.

19. An apparatus according to claim 18, wherein the stationary signal processing means further comprises means for transferring the digital or frequency signal from receiving means to means for determining the liquid layer thickness.

20. An apparatus according to claim 1 further comprising rotatable and stationary coils arranged to transfer inductive signal.

21. An apparatus according to claim 1, wherein the apparatus further comprises means for conducting power from a stationary power supply to the sensor.

22. An apparatus according to claim 1, wherein the sensor is arranged to measure the distance of the liquid layer from the sensor.

23. An apparatus according to claim 1, wherein said hollow rotor has a length to diameter ratio which is at least 2:1 and wherein at least half of the rotor length is arranged to rotate with a dry outer surface.

24. An apparatus according to claim 23, wherein said length to diameter ratio of said hollow rotor is preferably between 3:1 and 10:1.

25. An apparatus according to claim 1, wherein said stationary liquid outlet comprise a stationary pump housing surrounding less than half of the rotor.

26. An apparatus according to claim 1, wherein the rotatable sensor is arranged to measure the liquid layer thickness on the inner wall of said rotor.

27. An apparatus according to claim 1, wherein the apparatus is arranged to separate a gas from the fluid flowing in a pulp or papermaking process.

28. An apparatus according to claim 1, wherein the fluid is backwater in a papermaking process.

29. An apparatus according to claim 1, wherein the signal indicating a measured liquid layer thickness is transmitted from the sensor to a stationary signal processing means via an air interface.

30. An apparatus according to claim 29, wherein the sensor comprises a radio transmitter to transmit the measured signal through the air interface and the stationary signal processing means comprises a radio receiver to receive the transmitted measurement signal.

31. A degassing centrifugal apparatus comprising
a rotatable hollow rotor connected to a stationary fluid inlet at one end portion and a stationary liquid outlet at the opposite end portion, and having a gas exhaust for removing gas from the center thereof,
said apparatus having at said inlet end portion means for rotating said fluid and directing it to the inner wall of said rotor, characterized in that the apparatus further comprises a rotatable sensor arranged to measure the layer thickness of a liquid rotating in said apparatus,
wherein the rotatable sensor is arranged to measure the thickness of a liquid ring in pumping zone.

* * * * *

UNITED STATES PATENT AND TRADEMARK OFFICE
CERTIFICATE OF CORRECTION

| | |
|---|---|
| PATENT NO. | : 8,202,356 B2 |
| APPLICATION NO. | : 11/719626 |
| DATED | : June 19, 2012 |
| INVENTOR(S) | : Meinander et al. |

It is certified that error appears in the above-identified patent and that said Letters Patent is hereby corrected as shown below:

On the cover of the issued patent, at section (73) Assignee, delete "Pom Technology Oy AB, Helsinki (FI)" and insert --Aikawa Fiber Technologies OY, Varkaus, (FI)--.

Signed and Sealed this
First Day of January, 2013

David J. Kappos
*Director of the United States Patent and Trademark Office*